United States Patent [19]

Lohnherr et al.

[11] 4,420,064
[45] Dec. 13, 1983

[54] MEANS FOR LUBRICATING RADIAL SHAFT SEALING RINGS IN GRINDING ROLLS

[75] Inventors: Ludger Lohnherr, Oelde-Sunninghausen; Walter Holz, Beckum-Neubeckum, both of Fed. Rep. of Germany

[73] Assignee: Krupp Polysius AG, Fed. Rep. of Germany

[21] Appl. No.: 209,010

[22] Filed: Nov. 21, 1980

[30] Foreign Application Priority Data

Dec. 17, 1979 [DE] Fed. Rep. of Germany ... 7935481[U]

[51] Int. Cl.³ .................. F16N 29/02; B02C 15/00
[52] U.S. Cl. .................. 184/1 C; 184/6.4; 184/6.14; 184/103 R; 241/110
[58] Field of Search .......... 184/103 R, 105 R, 76, 184/78, 84, 85, 1 C, 1 R, 6.14, 6.4, 14; 241/107–111, 113–123, 301, 291, 66, 67, 91, 83, 84; 277/135

[56] References Cited

U.S. PATENT DOCUMENTS

| | | | |
|---|---|---|---|
| 1,317,961 | 10/1919 | Conwell | 184/103 R |
| 1,523,881 | 1/1925 | Kreutzberg | 241/116 X |
| 1,560,338 | 11/1925 | Dutro | 184/76 |
| 1,705,845 | 3/1929 | Woodman | 184/103 R |
| 2,582,901 | 1/1952 | Doyle | 184/103 R X |
| 3,147,821 | 9/1964 | Eggenberger | 184/76 X |
| 3,720,288 | 3/1973 | Tschabold | 184/6.4 |
| 3,951,347 | 4/1976 | Tiggesbaumker et al. | 241/119 X |
| 4,027,743 | 6/1977 | Deller et al. | 184/6.4 |
| 4,091,894 | 5/1978 | Lang | 184/103 R |
| 4,091,895 | 5/1978 | Lang | 184/103 R |
| 4,108,201 | 8/1978 | Lang | 184/103 R X |
| 4,109,871 | 8/1978 | Lohnherr | 241/110 X |
| 4,126,207 | 11/1978 | Dibowski et al. | 184/1 C |

*Primary Examiner*—David H. Brown
*Attorney, Agent, or Firm*—Learman & McCulloch

[57] ABSTRACT

Apparatus for lubricating the sealing rings of grinding roll bearings comprises an oil-containing vessel located at a level higher than that of the grinding roll bearings and connected via an oil conduit to an annular gap between the sealing rings. The oil conduit is disposed within an air line which delivers air to the gap.

6 Claims, 3 Drawing Figures

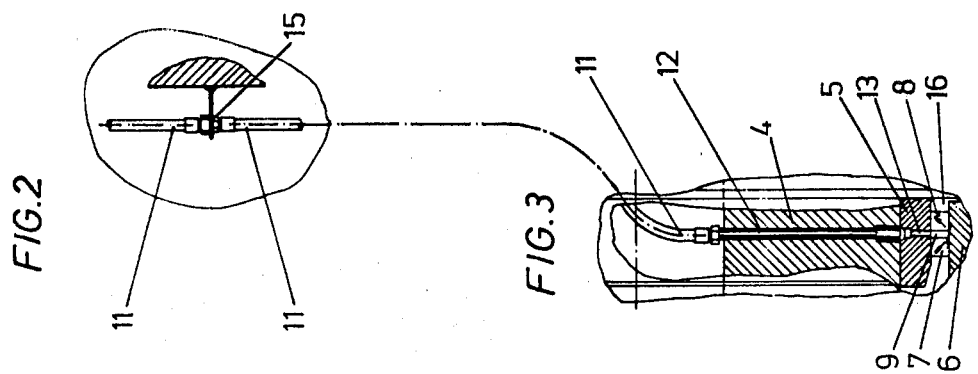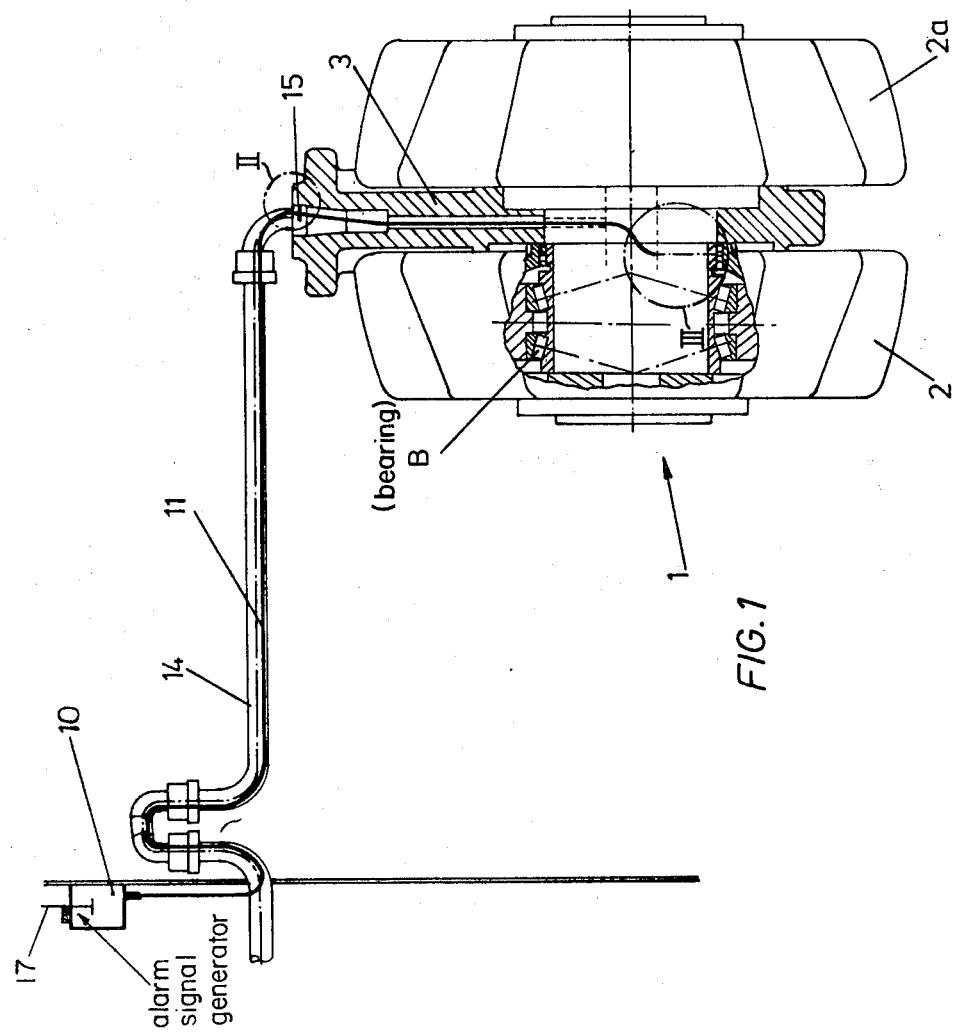

MEANS FOR LUBRICATING RADIAL SHAFT SEALING RINGS IN GRINDING ROLLS

The invention relates to apparatus for lubricating radial shaft sealing rings in bearings of grinding rolls, such rings being disposed adjacent each other in pairs and separated from each other by an annular gap. More particularly the invention relates to means for supplying lubricant to the annular gap between the two sealing rings.

It is known to lubricate radial shaft sealing rings in the bearings of grinding rolls with grease which is pressed after a certain operating time into a lubricating bore provided in the stationary roll carrier and opening into the annular gap between the two sealing rings. A disadvantage in these known constructions is in particular that the radial shaft sealing ring remote from the bearing can run dry under unfavorable operating conditions and thus be prematurely destroyed. This danger can occur in particular with unusually high operating temperatures, unusually high amounts of dust, or clogging of the lubricating bore.

The invention has for its objective the avoidance of the above defects by providing a particularly reliable apparatus for lubricating the radial shaft sealing rings on the bearings of grinding rolls.

This objective is achieved according to the invention by an oil-filled compensation vessel which is disposed at a level higher than that of the grinding rolls and connected to the annular gap via an oil conduit.

With apparatus according to the invention leakage of one of the two radial shaft sealing rings occurring for instance during operation manifests itself by a certain lowering of the oil quantity or level, and which is more pronounced than the lowering due to normal oil consumption. If the compensation vessel is equipped with an alarm signal generator the operator can take remedial steps before greater damage occurs.

If the radial shaft sealing ring on the bearing side leaks, an oil loss in the bearing is prevented by replenishing oil flow from the compensation vessel to the bearing. Oil flows into the bearing of the grinding roll until a static pressure balance is obtained between the bearing and the compensation vessel. Oil losses in the bearing are completely prevented in this manner.

If, however, leakage occurs at the radial shaft sealing ring remote from the bearing (on the air side) oil flows from the compensation vessel into the adjoining space which is generally subjected to blocking air via a blocking air line. The air side radial shaft sealing ring is further lubricated by replenishing oil flow so that unnoticed dry running is prevented.

In an embodiment in which the radial shaft sealing ring remote from the bearing adjoins a space which can be subjected to blocking air via a blocking air line connected to the stationary roll carrier of the grinding roll, the oil conduit is expediently disposed within the blocking air line. In this manner the oil conduit is protected from damage.

Conveniently, in such a case, the blocking air line and the oil conduit dispoed therein are connected by a common screw connection to the stationary roll carrier. In this manner the two lines may be easily removed when exchanging the grinding roll.

A preferred embodiment of the invention is illustrated diagrammatically in the drawings, wherein:

FIG. 1 is a schematic illustration of a grinding roll pair having lubricating means; and FIGS. 2 and 3 are detail illustrations of the regions marked II and III, respectively, in FIG. 1.

The roll pair 1 of a grinding mill illustrated in FIG. 1 comprises two roll bodies 2, 2a and a common stationary roll carrier 3. The stationary roll carrier 3 includes an axle 4 and a likewise stationary running or bearing surface 5.

The rotating portion of the roll pair 1 includes an inner, rotating bearing cover 6. Between the stationary running surface 5 and the rotating inner bearing cover 6 are a bearing B and two radial shaft sealing rings 7 and 8 leaving between them an annular gap 9.

An oil-filled supply vessel 10 is connected to the gap 9 between the sealing rings 7 and 8 via an oil conduit 11, a tube 12 disposed in the axle 4 and connected to the oil conduit 11, and a bore 13 passing through the running surface 5.

Furthermore, a blocking air line 14 is provided which is connected via a screw connection 15 to the stationary roll carrier 3. Although not illustrated in the drawings, connecting bores from the blocking air line 14 lead to the space 16 which adjoins the sealing ring 8 on the side remote from the bearing B. The sealing ring 7 however faces the bearing B of the roll pair 1.

The oil conduit 11 is led within the blocking air line 14 from the supply vessel 10 to the screw connection 15. The screw connection 15 is so formed that when it is necessary to change the roll pair 1 the blocking air line 14 and the oil conduit 11 disposed therein can be removed in simple manner.

FIG. 1 further shows that the supply vessel 10 is at a level higher than that of the uppermost point of the oil conduit 11 leading to the roll carrier 3.

The function of the lubricating means according to the invention should be clear:

If the two radial shaft sealing rings 7 and 8 are in order only very small amounts of oil pass from the annular gap 9 through the lubricating gaps in the region of the sealing rings 7 and 8. As a result the oil level in the supply vessel 10 drops only very slowly. If however one of the sealing rings 7 or 8 leaks, the oil level in the supply vessel 10 drops relatively rapidly which actuates an alarm signal generator 17 connected to the supply vessel.

We claim:

1. In a grinding roll assembly having a roll carrier on which at least one grinding roll is journaled by bearings and on which a pair of sealing rings is disposed and spaced from one another by a gap, the improvement comprising an air line in communication with said gap, an oil supply, and an oil conduit establishing communication via said air line between said oil supply and said gap.

2. The assembly according to claim 1 wherein said air line extends through said roll carrier.

3. The assembly according to claim 1 wherein said air line extends into a bore formed in said roll carrier and wherein said air line and said oil conduit are removably secured in said bore by a common screw connection.

4. The assembly according to claim 1 including signal means associated with said oil supply operable to indicate a predetermined lowering of the quantity of oil in said supply.

5. The assembly according to claim 1 wherein said oil supply is located at a level above that of said gap.

6. The assembly according to claim 5 wherein said oil supply is located at a level above that of said oil conduit.

* * * * *